July 4, 1972 P. SCHMALFELD ET AL 3,674,449
PROCESS OF BRIQUETTING FINE-GRAINED COKES WITH CAKING
COAL IN A PLASTIC STATE
Filed May 21, 1970 2 Sheets-Sheet 1

United States Patent Office 3,674,449
Patented July 4, 1972

3,674,449
PROCESS OF BRIQUETTING FINE-GRAINED COKES WITH CAKING COAL IN A PLASTIC STATE
Paul Schmalfeld, Bad Homburg, Heinrich Janssen, Wachebuchen-Hohe Tanne, Burkhard Bock, Duisburg, Werner Peters, Wattenscheid, and Erwin Ahland, Essen, Germany, assignors to Metallgesellschaft Aktiengesellschaft, Frankfurt am Main, and Bergwerks-Verban, Essen-Kray, Germany
Filed May 21, 1970, Ser. No. 39,205
Claims priority, application Germany, Aug. 23, 1969, P 19 42 957.3
Int. Cl. B30b 1/00; C10l 5/00
U.S. Cl. 44—10 R                                    13 Claims

ABSTRACT OF THE DISCLOSURE

In the briquetting of coke, including mixing coke with plastic-form caking coal to form a mixture at a temperature sufficiently high to maintain the plastic state of the caking coal, and forming the mixture into briquettes; the improvement obtained by holding the mixture at the preselected high temperature for 20 to 300 seconds under conditions such that the mixture is maintained in a stirred layer 50 to 200 centimeters thick.

---

The German patent publication 1,252,623 describes a process of briquetting coal, coke, or mixtures thereof with the addition of caking coal. That briquetting process is carried out at temperatures at which the caking coal is in a plastic state so that this softened coal acts like a binder.

In that process, that portion of the briquetting mixture which is not plastifiable is heated to above the temperature at which the caking coal is in a plastic state and is then combined, in a heavy-duty mixer, with the caking coal, which may itself have been preheated, to form a mixture which is at a temperature in the range at which the caking coal is in a plastic state. This mixture is then briquetted. When the components in the heavy-duty mixer have reached the desired temperature, the mixture is cooled by at least 20° C., preferably by 50–100° C. by introducing steam or water so that the degasification which accompanies the plastification of the coal is interrupted and the mixture is frozen, as it were, in its "plastic state." The mixture which has thus been slightly cooled is moved through an intermediate storage device and supplied by metering devices to the molds of the briquetting press.

In the practice of this process it has been found that the intermediate storage device referred to above is of considerable significance in the operation of the plant and particularly with respect to the quality of the resulting briquettes. The quality of the briquetting mixture supplied to the briquetting press can be influenced to a surprisingly large extent by a variation in the time during which the briquetting material resides in the intermediate storage device. Thus the selection of that time, in view of the residence time in the heavy-duty mixer, is of critical importance. For this reason, the intermediate storage device consists of a stirred vessel, in which the briquetting mixture is kept for a predetermined time while being continuously stirred. During this residence time, the briquetting mixture is ripened and degasified at a preselected prevailing temperature. This ripening may replace or at least effectively supplement the intermediate cooling used in the known process.

The invention relates to this process of briquetting coke, with the addition thereto of caking coal at temperatures at which the caking coal is in a plastic state, in which process that portion of the material to be briquetted which is not plastifiable is heated to a temperature above the temperature range in which the caking coal is in a plastic state and is then combined at this high temperature in a heavy-duty mixer, which may itself have been preheated, to form a mixture which is at a temperature at which the caking coal is in a plastic state, and thereafter briquetting the mixture.

The process according to the invention is characterized in that the hot briquetting mixture produced in the aforesaid heavy-duty mixer is subjected, before its briquetting, to a ripening process for a residence time of 20 to 300 seconds in a layer having a substantially constant height which layer is continuously stirred. The residence time may be most exactly adjusted and maintained as a function of the level of the briquetting material in a stirred vessel. The optimum value of this residence time is determined by testing the resulting briquettes for their crushing strength; a separate special determination is made for each mixture to be briquetted. The height of the layer in the stirred vessel is between about 50 centimeters and 200 centimeters, depending upon the properties of the caking coal and its proportion in the mixture to be briquetted.

The essential significance of the ripening process for the quality of the briquettes and for the performance of the briquetting process is due to a plurality of reasons, which are fairly different in nature.

An intermediate storage device providing a controlled residence time and interposed between the heavy-duty mixer and the briqueting press can compensate to a large extent for any variation of the rates at which caking coal and coke are supplied to the heavy-duty mixer.

The speed of the briquetting press may be varied to maintain the material in the intermedate storage device for a constant time and at a substantially constant level. This control of the briquetting process has a much faster response and does not change so many individual conditions as the change of the rates at which caking coal and hot coke are fed to the heavy-duty mixer. A change of these feed rates would also require a readjustment of the heating of the carbonizing reactor in which the hot coke is produced.

The plastic mixture to be briquetted has a viscosity such that it is capable of trickling during the ripening process and is disposed at a sufficiently high level to form a gas-tight barrier between the heavy-duty mixer and the intermediate storage device on the one hand, and the briquetting press on the other hand. As a result, the gases and vapors which are liberated during the degasification of the caking coal from the intermediate storage device can be exhausted virtually without any ingress of air and can be fed in a concentrated form to a by-product plant for the recovery of tar, middle oil and rich gas with separation of an aqueous liquid which is formed in the carbonization.

It has proved desirable to maintain the pressure in the intermediate storage device constant wthin a few millimeters of water by venting. Pressure variations greatly in excess of ±10 millimeters of water will result in a deterioration of the quality of the briquettes formed because the feeding of the briquetting material to he inlet openings of the briquetting press then becomes irregular. It is preferable to operate at a slightly subatmospheric pressure.

With briquetting material which degasifies very strongly or very slowly, the residence time required to complete the ripening process is very long. The desired residence time according to this invention may be partially accounted for by time spent in the heavy-duty mixer. For this purpose, the heavy-duty mixer may consist of two parts. The residence time required for the ripening process may be reduced in that the briquetting material is cooled to some extent in the heavy-duty mixer or between two heavy-duty mixers in the manner known from German patent specification 1,252,623, whereby water is sprayed into the mixer, with or without additional steam. This cooling may be carried out according to the invention by admixing cold char with the briquetting mixture in the heavy-duty mixer or during the ripening process in the intermediate storage device.

An apparatus for carrying out the process according to the invention is shown in the accompanying drawing and consists of a heavy-duty mixer, which may comprise two parts, and an intermediate storage device, which consists of a stirred vessel having a stirring mechanism that is rotatable preferably about a vertical axis.

A mixer having multiple screw shafts which rotate in the same casing has proved satisfactory as a heavy-duty mixer for use in this invention. Suitable adhesive properties are developed in the briquetting mixture as the caking coal is softened in the heavy-duty mixture, which properties can be controlled without difficulty. It has proved satisfactory to provide the screw shafts with mixing blades having an angle of inclination of 50–70° to the axes of the shafts and to provide the blades with hard tips at their wearing edges, while providing a smaller pitch and larger angle of inclination on the screw threads at the inlet end of the heavy-duty mixer under the feeders for the caking coal and coke. The caking coal is charged at the outer end of the small-pitch screw threads and the hot coke is charged approximately at the inner end of the small-pitch screw threads. The caking coal, which is cold or only moderately preheated, then acts as a cooling medium for the bearings of the screw shafts and prevents deleterious overheating of the caking coal as it meets the hot coke. The design of the intermediate storage device and its connection to the high-speed mixer involves subsantially critical features.

To insure that the briquetting mixture is continually mixed and agitated in the intermediate storage device in which it is held at a level of 50 centimeters to 200 centimeters, the stirring mechanism is provided with particularly strong, radial stirring arms which are very firmly secured to the stirrer shaft. The radial stirring arms are provided at their outer edges with suitable vertical cross-members, preferably of iron, so that they wipe the wall of the stirring vessel, as far as possible, throughout the height thereof. Flow disrupters may be mounted on the wall of the stirring vessel at various levels between the stirring arms and the cross-members to prevent the mixture from rotating as a compact body with the stirring arms. The level of the material in the stirred vessel may suitably be supervised with the aid of radioactive substances and Geiger counters. These may be suitably arranged so that the shielding action of the rotating thick parts of the stirring mechanism is compensated to a large extent. In addition to the supervision based on radioactivity, the torque exerted on the stirrer shaft may also be used as a measure of the level of the material in the vessel. Where an electric motor is used as a drive means, this torque will be indicated by the current drain. Where a hydraulic drive is used, the torque will be represented by the hydraulic pressure. The means for indicating the level of material are suitably connected to a signaling device. To maintain a constant level of the material in the stirred vessel, the speed of the briquetting press is adjusted by hand when the signal has been generated. The briquetting speed may also be controlled by an automatic system in response to the means which indicates the level of material.

The briquetting mixture is fed to the press from an opening in the bottom of the stirring vessel. There is one opening for each pair of rolls. Large presses of high capacity usually comprise two pairs of rolls; in this case there are two openings in the bottom of the stirred vessel. These openings are provided with gate valves for controlling the rate at which the mixture is supplied to the rolls. The feed rate of the mixture may also be desirably controlled by a flap, which extends in the inlet passage for the mixture throughout the width of a pair of rolls. The delivery edge of this flap is specially shaped so as to insure a uniform feeding of the mixture into the molds throughout the width of the pair of rolls.

An apparatus for carrying out the process according to the invention is shown diagrammatically and by way of example in the drawings wherein.

Figure 1:
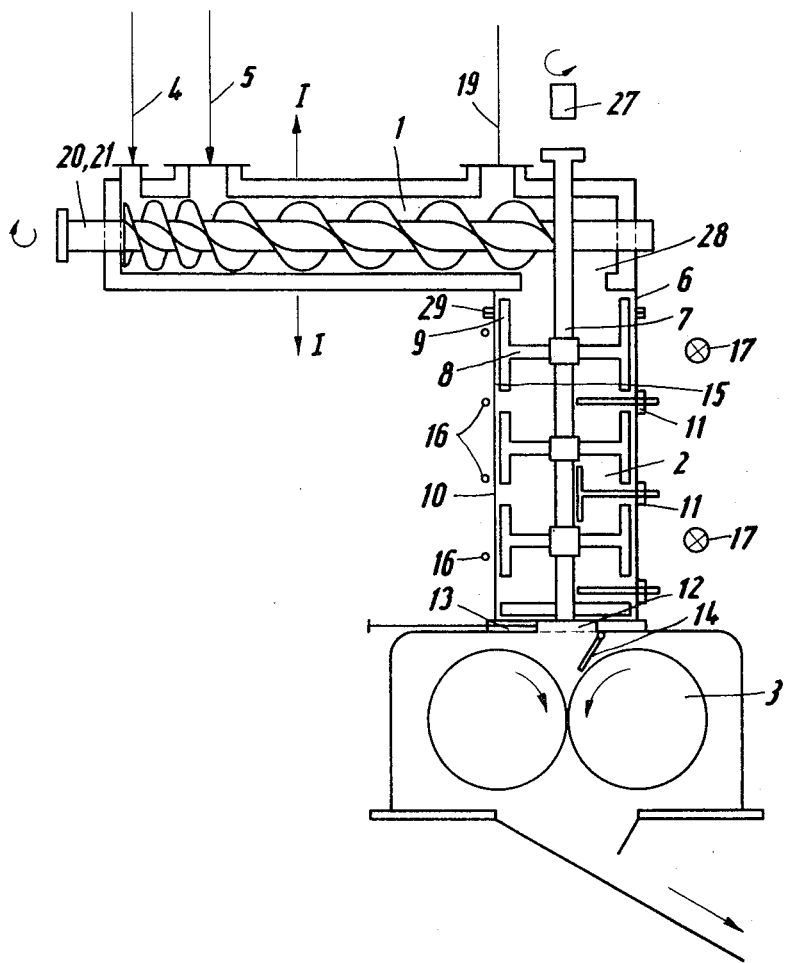
FIG. 1 is a vertical sectional view showing an apparatus according to this invention.

FIG. 1 shows a horizontally disposed, heavy-duty mixer 1, a vertically disposed, stirring vessel 2, and a double-roll press 3. The caking coal, which is pre-dried and which may have been preheated if desired, is charged into the heavy-duty mixer 1 through a conduit 4. Fine-grained hot coke is charged, e.g., at a temperature of 750° C., through a conduit 5. The caking coal and coke are thoroughly mixed with each other. During this mixing a temperature of the mixture of about 480° C., for example, is reached within about one minute and the caking coal is degasified as a function of this mixture temperature. At the end of the mixer, the mixture falls through a discharge opening 28 and a short, wide adapter 6 into a vertical stirring mechanism 2. The adapter 6 is a tube section, which is secured to the housing of the heavy-duty mixer and connected by a flange 29 to the stirring vessel and has the same diameter as the latter. A stirrer shaft 7 is centrally disposed in the stirring vessel 2, extends between two shafts 20, 21 of the heavy-duty mixer 1, and through its housing to a drive means 27. The stirrer shaft 7 has radial stirrer arms 8 which, at their free ends, are provided with vertical cross-members 9. These cross-members prevent the formation of substantial deposits on the wall surface of the stirring vessel 2. Flow disrupters 11 are secured in a wall 10 of the stirring vessel between the stirring arms 8 and the cross-members 9 in order to prevent the rotation of the mixture as a whole with the stirring arms. The number of stirring arms and the length of the cross-members is such that the cross-members wipe over the wall surface of the stirring vessel throughout at least the effective height thereof. The stirring vessel 2 has, at its bottom, an opening 12 through which the briquetting material is discharged into the press. The opening 12 can be constricted by a gate 13. The flow of the briquetting material to the briquetting press can also be controlled by a flap 14.

The surface of the briquetting material in the stirring vessel is maintained at a substantially uniform level, which is indicated at 15, and is supervised with the aid of radioactive indicators 16 and Geiger counters 17. This check of the level of the material in the vessel 2 may be supplemented or replaced by measurement of the torque at the drive means 27. Automatic control systems which are responsive to torque are known for electric motors and for hydraulic motors. According to the invention, the signals generated by the means for supervising the level of the material in the stirring vessel are utilized to control the speed of the briquetting press. In the simplest case which can be used in practice, a deviation of the level from its desired predetermined value is indicated by a visual or audible signal, in response to which the briquetting press is readjusted by hand.

The degasification of the briquetting material is substantially terminated in the stirring vessel. The gases and vapors which are liberated in the stirring vessel 2 and in the heavy-duty mixer 1 are discharged through a conduit 19 from the discharge end of the mixer and are exhausted through a condensing unit, not shown, so that a constant sub-atmospheric pressure of preferably about 1–3 millimeters of water below atmospheric pressure is maintained in the system comprising the mixer and the stirring vessel.

Figure 2:
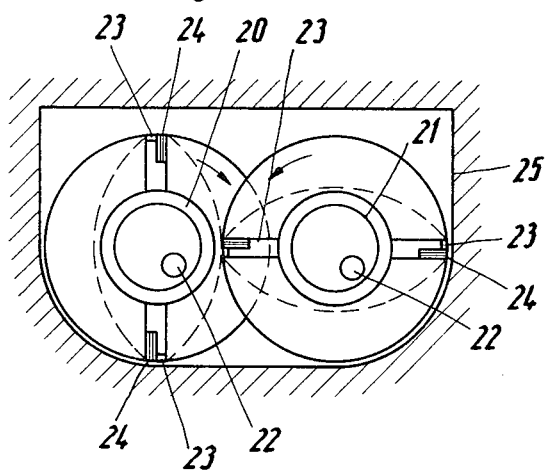
FIG. 2 is a vertical sectional view taken on line I—I of FIG. 1.

The two shafts 20 and 21 of the heavy-duty mixer are shown in cross-section in FIG. 2. The shafts are suitably hollow and are flowed through in known manner by water, oil or the like for cooling purposes. This liquid is supplied through a pipe 22 and is discharged through the remainder of the cross-section of the hollow shaft. Two dimetrically opposite mixing blades 23 are secured to each of the shafts 20 and 21. These mixing blades are provided at their outer edges with replaceable armoring elements 24, which are highly wear-resistant and consists of a hard material, such as Widia cemented carbides or the like. The tips 24 are suitably secured by screws or clamping means in the conventional manner so that spent tips can be conveniently replaced through openings in the mixer housing during short down periods without removing the mixer shafts. The mixing blades suitably extend throughout the mixing range of the shafts and form continuous helices. The best forward thrust will be obtained if the mixing blades have an angle of inclination in the range of 50–70°, preferably of 55–65°, relative to the axes of the shafts. The mixing blades terminate over the discharge opening 28 before the stirrer shaft 7, which is disposed between the shafts 20, 21.

The mixing blades form small-pitch screw threads at the receiving end of the heavy-duty mixer 1 under the feed conduit for caking coal. These small-pitch screw threads are first charged with caking coal through the connecting pipe 4. In this way, the temperature of the shafts in the bearings, which are provided with stuffing-boxes, may be maintained at about 100° C. When the charging is performed in this order, overheating of the caking coal as it is charged is prevented.

Figure 3:
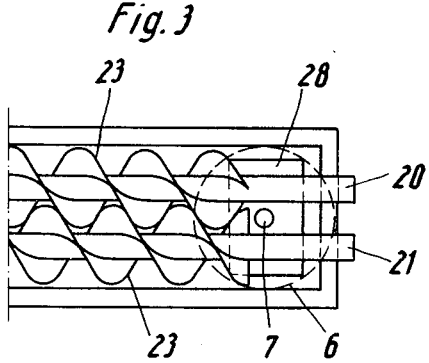
FIG. 3 is a top plan view of the discharge end of the heavy-duty mixed with the housing cover removed.

FIG. 3 is a diagrammatic top plan view showing the discharge end of the heavy-duty mixer with the top of the housing in an open condition. The reference characters are the same as those in FIGS. 1 and 2.

The rectangular discharge opening 28 is seen below the shafts 20, 21 and extends approximately throughout the inside width of the heavy-duty mixer and somewhat beyond the ends of the small-pitch screw threads 23.

The adapter 6 is a short pipe, which has the same diameter as the stirring vessel and is connected to the bottom of the heavy-duty mixer and, by the flanged connection 29, is connected to the stirring vessel 2. This adapter is designed in known manner to take up any thermal stresses which may occur between the heavy-duty mixer and the stirring vessel.

The discharge opening 28 serves at the same time as a passage for the gases and vapors which are formed in the stirred vessel 2 and are exhausted through the connecting pipe 19 provided at the heavy-duty mixer 1.

What is claimed is:

1. In the process of briquetting coke by forming a mixture of caking coal and coke at temperatures at which the caking coal is in a plastic state, in which process that portion of the material to be briquetted, other than said caking coal, is heated to a temperature above the temperature range in which the caking coal is plastifiable and is then combined in a heavy-duty mixer with the caking coal to form said mixture, which is at a temperature at which the caking coal is in a plastic state, and briquetting said mixture; the improvement which comprises ripening the hot briquetting mixture produced in the heavy-duty mixer before its briquetting for a residence time of 20–300 seconds in a layer having a substantially constant height of about 50–200 centimeters and is being continuously stirred.

2. An improved process as claimed in claim 1, wherein the vapors and gases evolved during said mixing and ripening process are exhausted at a substantially constant pressure having a variation of about ±10 millimeters of water, which gas is then condensed.

3. An improved process as claimed in claim 1, wherein the vapors and gases evolved during said mixing and ripening process are exhausted at a substantially constant pressure having a variation of about ±3 millimeters of water, which gas is then condensed.

4. An improved process as claimed in claim 1, wherein cold fine-grained coke is continuously added to the briquetting mixture during the ripening process.

5. An improved process as claimed in claim 1, wherein cold fine-grained coke is intermittently added to the briquetting mixture during the ripening process.

6. An improved process as claimed in claim 1, wherein the heavy-duty mixer is first charged with the caking coal and is then, at a succeeding location, charged with said coke.

7. Apparatus for carrying out the process claimed in claim 1, comprising a heavy-duty mixing means, with a plurality of inlets an intermediate storage means, and a double-roll press, wherein the intermediate storage means consists of a vessel containing a stirring mechanism which rotates about a vertical axis and means for supervising the level of the material in the vessel, which intermediate storage means is directly connected to the discharge opening of the heavy-duty mixer and to the feed means of said double-roll press.

8. Apparatus as claimed in claim 7, wherein said vessel contains a vertical stirrer shaft which extends between two screw shafts of said heavy-duty mixer and through the top of a housing to a drive means.

9. Apparatus according to claim 8, wherein said stirrer shaft has radial stirring arms, vertical cross-members thereon, and wherein the shell of said vessel has flow disrupters thereon.

10. Apparatus as claimed in claim 7, including means for indicating the level of material in the vessel consisting of radioactive indicator means and Geiger counter means, which are mounted on opposite points of the shell of said vessel.

11. Apparatus as claimed in claim 8, including a discharge opening in the bottom of said heavy-duty mixer and an adapter connecting such discharge opening to said vessel by a flange connection.

12. Apparatus as claimed in claim 8, wherein each shaft of the heavy-duty mixer has two diametrical mixing blades each of which has wearing edges provided with strips of highly wear resistant material and wherein the angle of inclination of the portion of said blades where the coal is charged is at least about 70° with respect to the axis of the shaft and wherein the angle of inclination of the rest of said blades is about 50–70° relative to the axis of the shaft.

13. Apparatus as claimed in claim 8, wherein each shaft of the heavy-duty mixer has two diametrical mixing blades, each of which has wearing edges provided with strips of highly wear resistant material and wherein the angle of inclination of the portion of said blades where the coal is charged is at least about 70° with respect to the axis of the shaft and wherein the angle of inclination of the rest of said blades is about 55–65° relative to the axis of the shaft.

References Cited

UNITED STATES PATENTS

| | | | |
|---|---|---|---|
| 1,916,306 | 7/1933 | Fisher | 44—13 |
| 3,308,219 | 3/1967 | Schmalfeld et al. | 264—122 |

FOREIGN PATENTS

| | | | |
|---|---|---|---|
| 1,072,520 | 6/1967 | Great Britain | 44—13 |
| 1,471,555 | 3/1969 | Germany | 44—10 |

CARL F. DEES, Primary Examiner

U.S. Cl. X.R.

44—13; 264—122